United States Patent
Sarria, Jr.

(10) Patent No.: US 11,612,818 B2
(45) Date of Patent: *Mar. 28, 2023

(54) SPECTATOR SWITCH BOARD CUSTOMIZED TO USER VIEWPORT SELECTION ACTIONS

(71) Applicant: Sony Interactive Entertainment Inc., Tokyo (JP)

(72) Inventor: Mario M. Sarria, Jr., San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 58 days.

This patent is subject to a terminal disclaimer.

(21) Appl. No.: 17/229,817

(22) Filed: Apr. 13, 2021

(65) Prior Publication Data
US 2021/0299561 A1      Sep. 30, 2021

Related U.S. Application Data

(63) Continuation of application No. 16/721,914, filed on Dec. 19, 2019, now Pat. No. 10,974,147.

(51) Int. Cl.
*A63F 13/5252* (2014.01)
*A63F 13/86* (2014.01)

(52) U.S. Cl.
CPC ......... *A63F 13/5252* (2014.09); *A63F 13/86* (2014.09)

(58) Field of Classification Search
CPC ...... A63F 13/5252; A63F 13/86; A63F 13/52; A63F 13/525
USPC ............................................................ 463/31
See application file for complete search history.

(56) References Cited

U.S. PATENT DOCUMENTS

| | | | |
|---|---|---|---|
| 9,311,741 B2 * | 4/2016 | Rogers .................. | G06T 19/006 |
| 9,517,417 B2 * | 12/2016 | Austerlade ............ | A63F 13/828 |
| 11,090,568 B1 * | 8/2021 | Mattar ................... | A63F 13/211 |
| 2016/0193530 A1 * | 7/2016 | Parker ..................... | A63F 13/00 463/29 |

* cited by examiner

*Primary Examiner* — Allen Chan
(74) *Attorney, Agent, or Firm* — Penilla IP, APC

(57) ABSTRACT

Methods and systems are provided for selecting viewports into a game. One example method includes identifying a plurality of virtual cameras for providing viewports into the game. The method includes accessing a playbook of a spectator user, and the playbook identifies performance of the spectator user in the game. The method includes accessing event data for the game as the game is played live or recorded. The method includes generating a switchboard interface for the spectator user including a plurality of viewports providing optional views into the game. The plurality of viewports is dynamically selected based on processing the event data and the playbook of the spectator user through a machine learning model. The machine learning model is configured to identify features from the event data and the playbook to identify attributes of the spectator user. The attributes of the spectator user are used to select the plurality of viewports into the game.

20 Claims, 7 Drawing Sheets

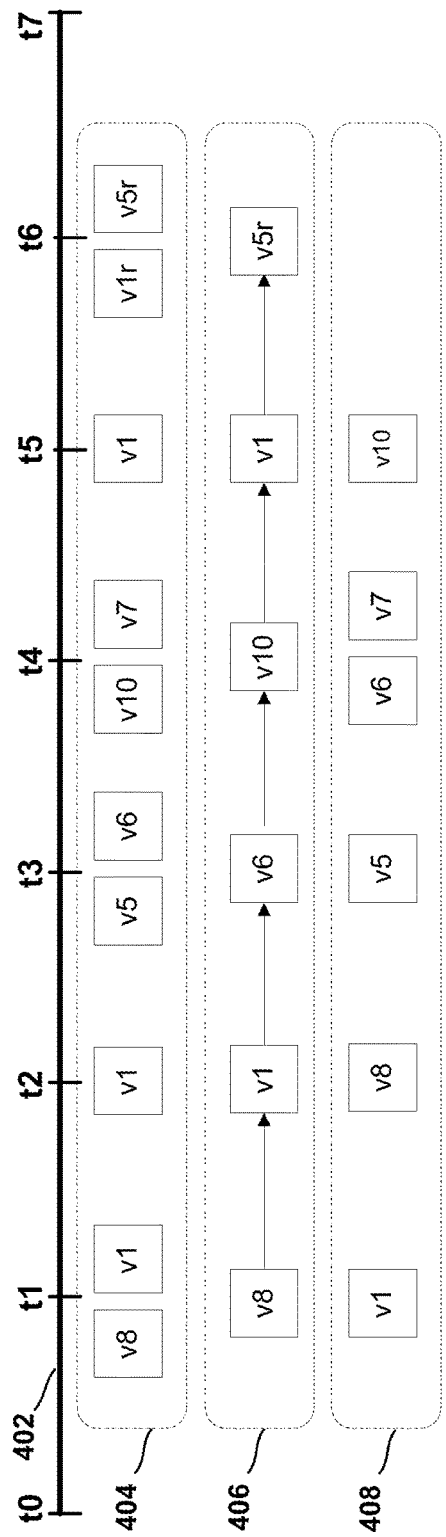
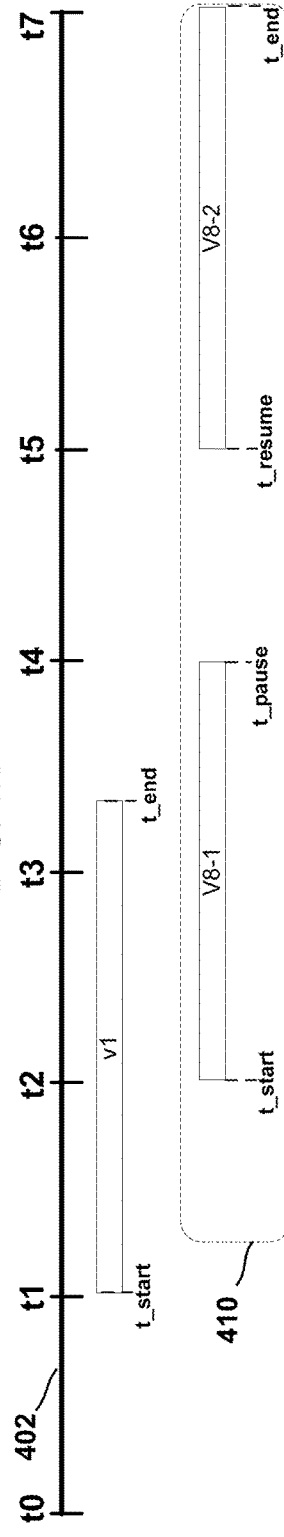
FIG. 4A
FIG. 4B

SPECTATOR SWITCH BOARD CUSTOMIZED TO USER VIEWPORT SELECTION ACTIONS

CLAIM OF PRIORITY

This application claims priority to and the benefit of U.S. patent application Ser. No. 16/721,914 filed on Dec. 19, 2019 (U.S. Pat. No. 10,974,147, issued on Apr. 13, 2021), entitled "Spectator Switch Board Customized to User Viewport Selection Actions," of which is incorporated herein by reference in its entirety.

BACKGROUND

1. Field of the Disclosure

The present disclosure relates to selecting viewports into a live gaming event for spectators using event data, spectator profile data, and feedback from the spectator.

2. Description of the Related Art

The video game industry has seen many changes over the years. In particular, the electronic (e.g., E-sports) industry has seen a tremendous growth in terms of the number of live events, viewership, and revenue. To this end, developers have been seeking ways to develop sophisticated operations that would enhance the experience of spectators who may view E-sports events from a remote location.

A growing trend in the E-sports industry is to develop unique ways that will enhance the experience of spectators who are unable to attend a live viewing of the event. Unfortunately, many spectators who watch the live event remotely may be uninterested in the content that they are viewing or find it inefficient or too complex to sort through all the content that is made available to them. For example, when a spectator accesses a live E-sports event remotely, the viewer might find that the content they are viewing is boring and will have to spend a significant amount of time locating a particular scene within the event that they might find interesting. As a result, many spectators might find that the process of watching live or recorded E-sports events remotely is too burdensome or will lose interest in viewing additional events in the future.

It is in this context that implementations of the disclosure arise.

SUMMARY

Implementations of the present disclosure include devices, methods and systems relating to selecting viewports into remote gaming scenes that are identified as interesting or relevant to a viewer's (e.g., spectator) preferences. In some embodiments, the selection of viewports uses a process for discovery content that for a spectator and presenting options of viewports to watch. For live gaming events, the viewports provide remote spectators with views into actions at specific times before specific game actions are predicted to occur. In one embodiment, the prediction function uses machine learning models that learn gaming interactivity of game players and predict when certain actions that are interesting to certain spectators may occur. As a result, the spectator is provided with a dynamic viewing experience where viewport options are surfaced to the spectator. The spectator is thus able to efficiently navigate between viewports, in substantial real-time, to view interesting action in multiple games. In one embodiment, the cloud system can detect when spectators move between live events, and if the spectator navigates away to new interesting content, the content that was being watched can be automatically recorded for later transition back for delayed view.

In one embodiment, a method for selecting viewports into a game is disclosed. In this embodiment, the method includes identifying a plurality of virtual cameras for providing viewports into the game. The method accesses a playbook of a spectator user, and the playbook stored in association with a profile of the spectator user. The playbook identifies performance of the spectator user in the game and other games played by the spectator user. The method includes accessing event data for the game as the game is played live. The method includes generating a switchboard interface for the spectator user including a plurality of viewports providing views into the game. The plurality of viewports is dynamically selected for inclusion into the switchboard interface based on processing the event data and the playbook of the spectator user through a machine learning model. The machine learning model is configured to identify features from the event data and the playbook to classify attributes of the spectator user. The attributes of the spectator user are used to select the plurality of viewports into the game. The method includes updating the switchboard interface to include one or more changes to selection of the plurality of viewports while the spectator user is viewing one of the plurality of viewports. The updating is configured to occur based on contextual changes in the game identified from the event data.

In another embodiment, a method for presenting viewports into a game to a spectator user is disclosed. The method includes identifying a plurality of virtual cameras for providing viewports into the game. The method includes accessing a playbook of the spectator user. The playbook stored in association with a profile of the spectator user. The playbook identifies performance attributes of the spectator user in relation to one or more game features of the game. The method includes accessing event data for the game as the game is played live. The method includes generating a switchboard interface for the spectator user including a plurality of viewports providing views into the game. The plurality of viewports is dynamically selected for inclusion into the switchboard interface based on processing the event data and the playbook of the spectator user through a machine learning model. The method includes updating the switchboard interface to include one or more changes to selection of the plurality of viewports while the spectator user is viewing one of the plurality of viewports.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 4A illustrates an embodiment of a timeline with viewports selected for inclusion into a switchboard interface, viewports selected by a spectator user, and viewports for recording, in accordance with an implementation of the disclosure.

FIG. 4B illustrates an embodiment providing a visual representation of the length of each recorded viewport with its corresponding start and end time, in accordance with an implementation of the disclosure.

DETAILED DESCRIPTION

Figure 1:
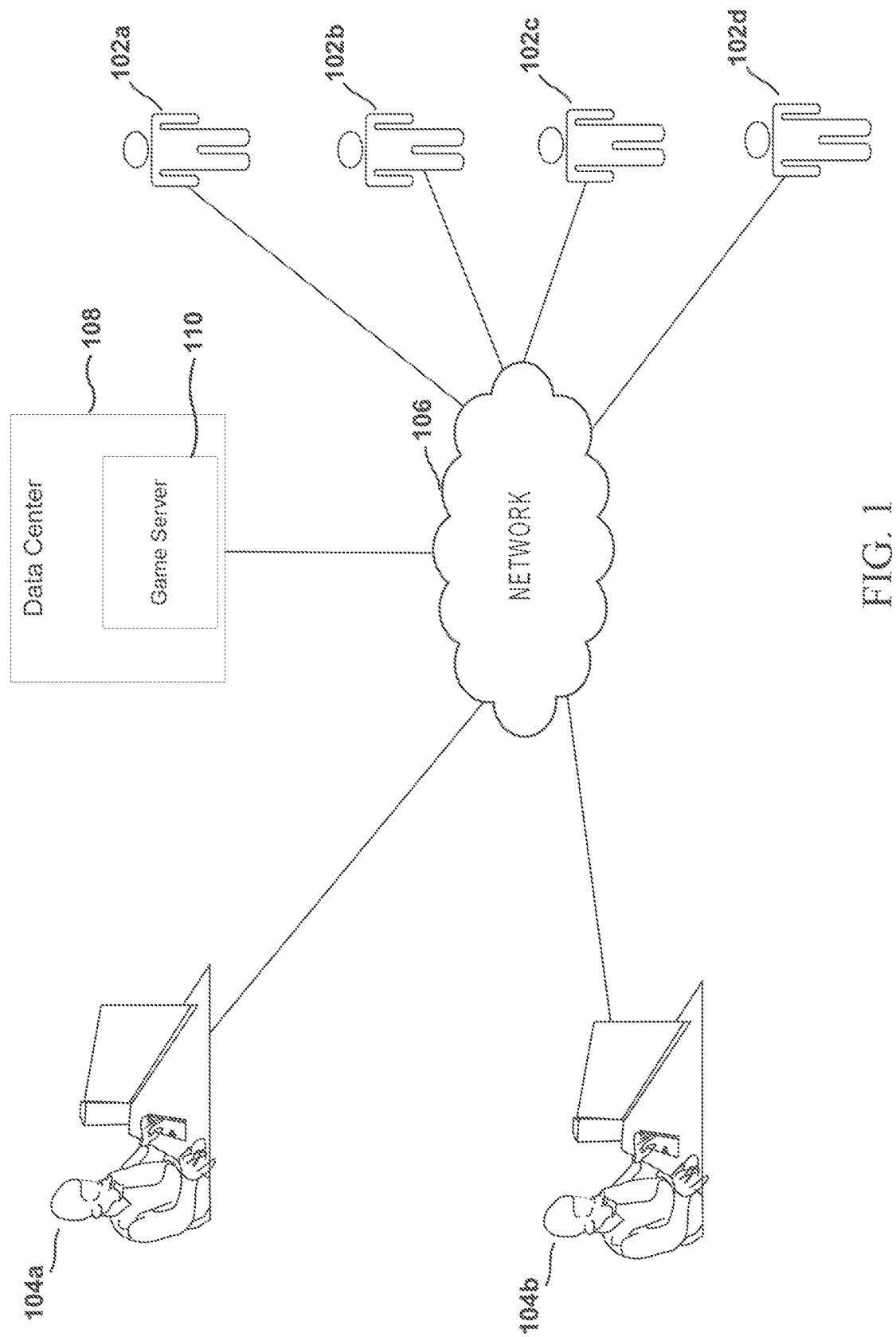
FIG. 1 illustrates an embodiment of a system for executing a game and sending viewports to spectator users, in accordance with an implementation of the disclosure.

The following implementations of the present disclosure provide devices, methods, and systems for selecting viewports into games or live games (e.g., electronic sports events) by spectator users. By way of example, the selection of viewports is facilitated by cloud processing of event data and/or spectator playbook data. In one embodiment a method is disclosed that enables generating a switchboard interface that includes viewports into a live game that is customized for a spectator user. The method includes identifying a plurality of virtual cameras for providing viewports into the game. In addition, the method includes accessing a playbook of a spectator user to identify player performance of the spectator user in the live game or other games. Further, the method includes accessing event data for the game as the game is being played live. Moreover, the method includes generating a switchboard interface for the spectator user. The switchboard interface can be customized for each spectator user and include a plurality of viewports providing views into the game. Additionally, the method further includes generating a viewport interface for a viewport selected by the spectator user. As used herein, a viewport into a game refers to different camera views into a specific game. Generally, some games are played by multiple users and in different locations of the game world. The game world has different actions occurring at the same time, such as actions by one or more users playing and taking actions in the game to score points, achieve goals, and/or interact with the game environment and/or other users. In this context, a game scene in the world can include one or more camera views into the actions, and those camera views can provide spectators with different perspective views into the same scene. The camera views, therefore, provide viewports into the game scenes. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for selecting custom viewports into a game. For example, the game may be a particular game being played live during an E-sports event. In one embodiment, the system includes a plurality of players connected over a network. The plurality of players may be playing a game and/or competing against one another in a live gaming event (e.g., E-sports event). In one embodiment, one or more data centers and game servers can execute the game and enable connections to players and spectators when hosting a live game. The one or more game servers of one or more data centers may be configured to receive, process, and execute data from a plurality of players. In one embodiment, a plurality of spectator users may also be provided with connections to a game cloud system for viewing users involved in active game play over the network. The spectator users can be physically located at the live event and/or located remotely anywhere in the world. In one embodiment, the spectator users can be configured to receive a switchboard interface that includes one more viewports into the live game play. The switchboard interface can be customized for each spectator since the selection of the viewports are based, in part, on the spectator user attributes, thus, resulting in one or more viewports that are aligned with the interests of the spectator user.

In accordance with another embodiment, a live game may include one or more scenes that are occurring simultaneously at a given time. The live game may include a plurality of virtual cameras dispersed throughout the game environment which provide a corresponding viewport into the game. Each scene may capture a specific part within the game world as players progress along different paths, stages, or levels of the game. Each scene may include a plurality of virtual cameras that capture and provide a unique viewport of the corresponding scene to allow viewers to see what is occurring within the scene.

For example, a scene may include a war battle occurring between a solider and an enemy solider. The solider and the enemy solider may be controlled by a first player and a second player, respectively. In another embodiment, the first player may be playing a non-player character (NPC). The war battle scene may include a first virtual camera and a second virtual camera that are positioned at different locations within the scene which captures two distinct viewports into the scene. The first virtual camera having an associated first viewport may be positioned behind the enemy solider can capture a view from behind the enemy solider. The second virtual camera having an associated second viewport may be positioned behind the solider can capture a view from behind the solider. Accordingly, two distinct viewports are available for the war battle scene which can provide a view of all the actions and events that occur within the scene.

In accordance with another embodiment, the system includes generating a switchboard interface for the spectator user. In one embodiment, the switchboard interface can include one or more viewports that provide views into the live game. As noted above, the switchboard interface can be customized for each spectator user. The switchboard interface may include viewports that are unique for each spectator user. This can be accomplished by analyzing a spectator playbook associated with the spectator user and selecting viewports that are aligned with the interests and preferences of the spectator user.

In one embodiment, the spectator playbook may include various spectator user attributes such as gaming experience, gaming history, viewing history, gaming skill level, preferences, interests, dislikes, etc. In one embodiment, these attributes are processed and used to determine which viewports the spectator user might be interested in and in turn be selected for inclusion into the switchboard. In one embodiment, an artificial intelligence (AI) model is generated and used to process spectator attributes. By way of example, the attributes are processed by identifying features associated with each of the attributes. The features are then labeled using a classification algorithm for further refining by the AI model. For example, a spectator playbook may indicate that the spectator user has an interest in combat sports and motorsports. When determining which viewports to include in the switchboard interface, the system may select viewports from the live event that include scenes related to combat actions (e.g., mixed martial arts, kickboxing, boxing, wrestling, etc.) and/or motorsport related actions (e.g., formula racing, motorcycle racing, snowmobile racing, motorboat racing, or racing, etc.). This would provide the spectator user with an efficient way of locating viewports that may be of interest to the spectator user rather than having to sort through an entire grid of viewports may be available for a live event.

In accordance with another embodiment, after the spectator user selects the desired viewport, the system can generate a viewport interface for live or non-live viewing. In one embodiment, the viewport interface can include a view of a particular scene within the live game that is captured by the corresponding virtual camera. In some embodiments, the viewport interface may include a live chat section where the spectator user and/or other viewers can comment on the activity occurring within the viewport. In other embodiments, the viewport interface may include a commentary section where a play-by-play commentary of the scene is provided in real-time. In some embodiments, the play-by-play commentary can be described through written text and/or through words spoken by an avatar and/or a virtual influencer.

In accordance with another embodiment, viewports that are not selected by the spectator user for viewing can be recorded for non-live viewing. As described in the example of FIG. 3E below, a switchboard interface with viewports (e.g., v8 and v1) may be presented to the spectator user. If the spectator user selects viewport v8 for live viewing, viewport v1 can be automatically recorded and be available for viewing at a later time. In some embodiments, the length of the recording will vary and depend on the activity within the scene. The system can distinguish between an active scene and an inactive scene. For example, in a combat fighting scene, if there is a "knockout," the fight ends which results in an inactive scene. Other scene activity metrics may also be processed to determine when a scene has low or no activity. Accordingly, the recording of the viewport can automatically end at some point subsequent to the action, e.g., the "knockout."

In another embodiment, the system further includes an Artificial Intelligence (AI) module that is configured to predict viewports for inclusion into the switchboard interface for a given spectator user. In one embodiment, the AI module is configured to receive event data as an input. The event data may contain information related to the live game that is being played such as the number of scenes in the event, game actions performed by a player, progression of the game, points scored, actions taken, number of virtual cameras, various viewports, etc.

In another embodiment, the AI module can be configured to receive the spectator playbook as an input. As noted above, the spectator playbook may include spectator user attributes such as gaming experience, gaming history, viewing history, skill level (e.g., novice, intermediate, expert), interests, preferences, likes, dislikes, etc. The spectator playbook may include characteristics and attributes of the spectator user which can be processed by the AI module to select viewports that may be of significance to the spectator user. In another embodiment, the AI module can be configured to receive spectator feedback as an input. For example, when watching a viewport, the spectator user may type a comment in the live chat section stating that "this is boring." The system may process this information and infer that the particular viewport that the spectator user is viewing is not appealing to the spectator user.

With the above overview in mind, the following provides several example figures to facilitate understanding of the example embodiments.

FIG. 1 is an embodiment of a system configured to execute a game and to send viewports to spectator users. As shown in FIG. 1, the system includes spectator users 102a-102d, players 104a-104b, a data center 108, a game server 110, and a network 106. According to the embodiment shown, players 104a and 104b are coupled to and can communicate with the data center 108 and the game server 110 through the network 106. The system of FIG. 1 may be referred to as a cloud gaming system, where multiple of said data centers and game servers maybe work together to provide wide access to users and players in a distributed and seamless fashion.

The players 104a and 104b can be playing a game and/or competing against one another in a live event (e.g., E-sports event). Players 104a and 104b can be configured to send game commands to the data center 108 and the game server 110 through the network 106. In addition, the players 104a and 104b can be configured to receive encoded video streams and decode the video streams received by the data center 108 and game server 110. In some embodiments, the video streams may be presented to players 104a and 104b on a display and/or a separate device such as a monitor or television. In some embodiments, the devices of the users and spectators can be any connected device having a screen and internet connections.

The spectator users 102a-102d can be coupled to and can communicate with the data center 108 and the game server 110 through the network 106. Broadly speaking, the network 106 may include local or remote networks, including the Internet. The spectator users 102a-102d are configured to receive encoded video streams and decode the video streams received from the data center 108 and game server 110. The encoded video streams, for example, are provided by the cloud gaming system, while user devices provide inputs for interacting with the game.

In one embodiment, the spectator users 102a-102d can receive video streams such as one or more viewports from a live game that is being executed by players 104a and 104b. The viewports may be presented to the spectator users 102a-102d on a display of the spectator users or on a separate device such as a monitor, or television or head mounted display, or portable device. In some embodiments, the spectator users 102a-102d may be configured to send feedback to the data center 108 and the game server 110 through the network 106. The spectator users 102a-102d can be optionally geographically dispersed. For example, spectator users 102a and 102b may be present at the live gaming event while spectator users 102c and 102d can be located in different countries.

Figure 2:
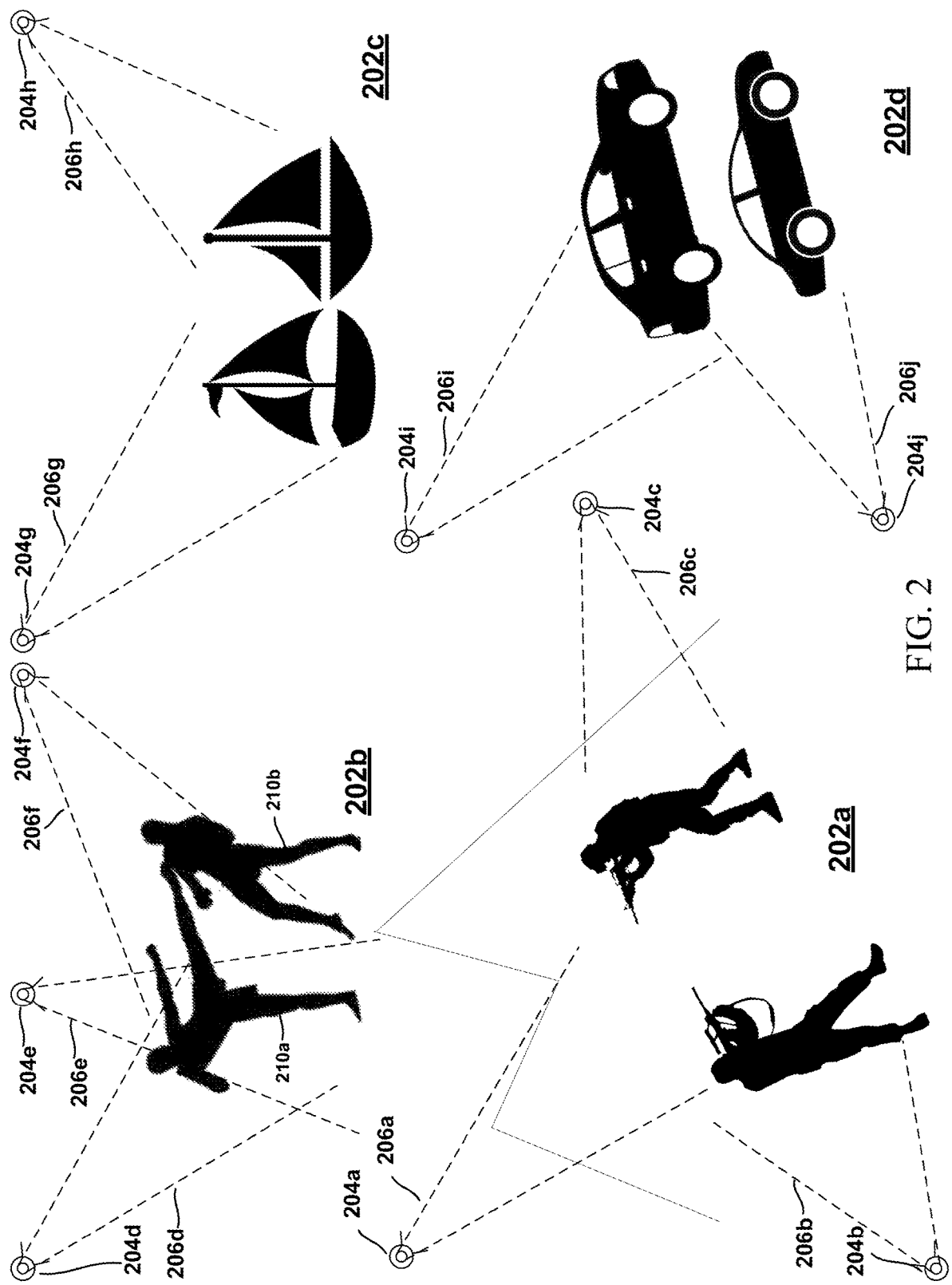
FIG. 2 illustrates an embodiment of multiple scenes within a game, in accordance with an implementation of the disclosure.

FIG. 2 illustrates an embodiment of multiple scenes occurring within a live game. In accordance with one embodiment, as shown in FIG. 2, the live game can include a plurality of scenes 202a-202d that are occurring simultaneously at a given time. The live game may include a plurality of virtual cameras 204a-204j positioned throughout the game environment that is configured to record the live game. Each virtual camera has an associated camera point of view (POV) 206 that can capture and record the activity occurring within its view and periphery. Accordingly, the plurality of virtual cameras 204a-204j can capture and provide one or more unique viewports into the live game.

According to the embodiment shown, a first scene 202a illustrates a war scene occurring between a solider and an enemy solider within the live event. The solider and the enemy solider may be controlled by the players 104 that are participating in the live game event. The first scene 202a includes a first virtual camera 204a, a second virtual camera 204b, and a third virtual camera 206c that is configured to record the activity occurring within the scene. The virtual cameras 204a-204c can be positioned anywhere within the scene to capture a different perspective of the actions within the scene. In the embodiment shown, the first virtual camera 204a is positioned above the soldiers and pointed in a downward direction towards both soldiers. The first virtual camera 204a may have a corresponding camera POV 206a that captures the activity occurring within its periphery. For example, within the POV 206a of the first virtual camera 204a, the camera POV 206a may include an overhead view of the war battle between the solider and the enemy solider.

In another embodiment, the first scene 202a may include a second virtual camera 204b that is positioned behind the enemy solider. The second virtual camera 204b may have a corresponding camera POV 206b that records the scene from a perspective behind the enemy solider. Within the camera POV 206b, the POV may include both soldiers during the battle scene. Similarly, the first scene 202a may include a third virtual camera 204c that is positioned behind the solider. The third virtual camera 204c may have a corresponding camera POV 206c and may be configured to record the scene from behind the enemy solider. Accordingly, three viewports are available for viewing the war scene.

According to another embodiment, as shown in FIG. 2, the second scene 202b illustrates a kickboxing match within the live event. The second scene 202b shows a first kickboxer 210a and a second kickboxer 210b competing during the live event. The second scene 202b includes a fourth virtual camera 204d, a fifth virtual camera 204e, and a sixth virtual camera 204f that are positioned at different positions and configured to record the kickboxing match between the two fighters. As noted above, each virtual camera 204 has a corresponding camera POV 206, e.g., 206d, 206e, and 206f, that captures a unique perspective of the scene and provides a unique viewport into the live game. For example, as illustrated in the second scene 202b, the fourth virtual camera 204d and the sixth virtual camera 204f are positioned such that both virtual cameras captures the movements and actions of both kickboxers. However, the fifth virtual camera 204e can be positioned such that it captures the actions of only the first kickboxer 210a. In this example, the first kickboxer 210a may be the kickboxing champion and is likely to draw more attention than the second kickboxer 210b. Accordingly, multiple viewports are made available for viewing the first kickboxer 210a than the second kickboxer 210b since more viewers are likely drawn to the champion fighter.

According to another embodiment, as shown in FIG. 2, the third scene 202c illustrates sailboat race competition within the live event. The third scene 202c shows a first sailboat and a second sailboat competing in a race during the live event. The third scene 202c includes a seventh virtual camera 204g and an eighth virtual camera 204h that are positioned at different positions above the sailboats. The seventh virtual camera 204g having a corresponding POV 206g is positioned toward the rear section of the sailboats can capture a view of both sailboats. The eighth virtual camera 204h with a corresponding POV 206h is positioned towards the front section of the sailboats can also capture a view of both sailboats. Accordingly, two viewports are available for viewing the sailboat race competition.

According to another embodiment, as shown in FIG. 2, the fourth scene 202d illustrates a car racing competition within the live event. The fourth scene 202d includes a ninth virtual camera 204i and a tenth virtual camera with its corresponding POVs. The ninth virtual camera 204i is positioned above and towards the rear of the cars which can capture both cars. The tenth virtual camera 204j is positioned behind both cars and which can capture a different perspective of both cars. Accordingly, two viewports are available for viewing the car race competition.

Figure 3A:
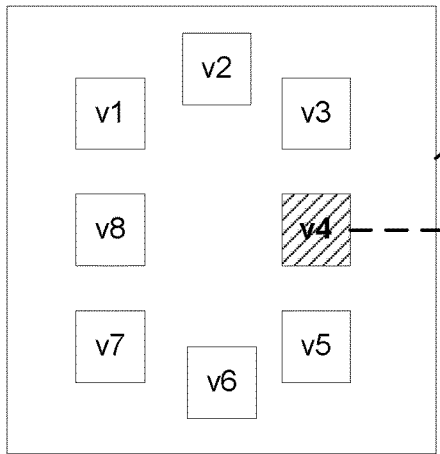
FIGS. 3A-3F illustrate various embodiments of switchboard interface and its corresponding viewport interface after a spectator user selects a desired viewport for viewing, in accordance with an implementation of the disclosure.
Figure 3B:
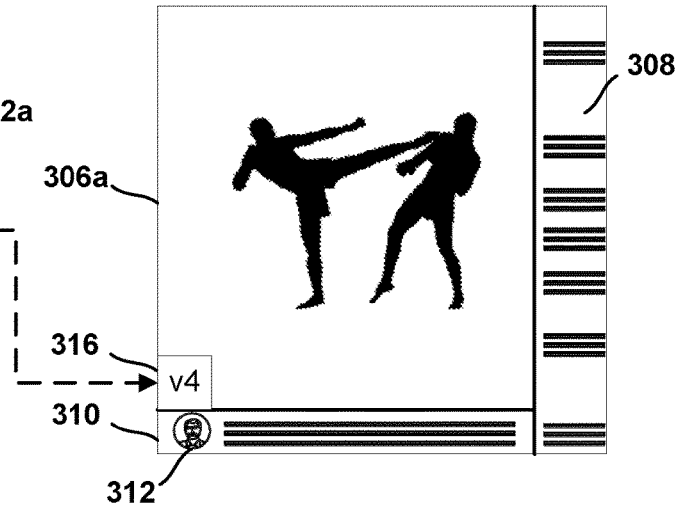

FIGS. 3A-3F illustrate various embodiments of a switchboard interface 302a and its corresponding viewport 306a interface after the spectator user selects a desired viewport for viewing. In one embodiment, as shown in FIGS. 3A and 3B, the figures illustrate the switchboard interface 302a and the generated viewport interface 306a after the spectator user 102 selects viewport 303 (e.g., v4) to view. As shown in FIG. 3A, the switchboard interface 302a includes a total of eight viewports 303 (e.g., v1-v8) that have been dynamically selected by the system for inclusion into the switchboard interface 302a. As noted above, the viewports 303 are associated with corresponding virtual cameras 204 and POVs 206 that provides views into the live game. Accordingly, in this example, the spectator user 102 may select from a total of eight viewports (e.g., v1-v8) to generate a viewport interface 306 for viewing.

In one embodiment, the selection of the viewports 303 for inclusion into the switchboard interface 302 may be based on event data and a playbook of the spectator user 102. The event data may include a variety of information associated with the game that is being played live by the players 104. The event data may be information associated with the game play such as the scenes in the live game, actions performed by the players, interactions between the players, progression in the game, points scored, total number of virtual cameras, available viewports, contextual data regarding scenes in the game, metadata associated with game state of one or more specific users, etc. Furthermore, the playbook associated with the spectator user 102 may include spectator user attributes such as gender, age, gaming experience, game play history, viewing history, gaming skill level, preferences, interests, disinterests, etc.

As further shown in FIG. 3A, the spectator user 102 may choose from a total of eight viewports 303 that are presented to the spectator user 102 in the switchboard interface 302a. The viewports 303 presented to the viewports 303 may be aligned with the interests of the spectator user 102. For example, a spectator playbook may reveal that the spectator user 102 is an 18-year-old male who primarily purchases and plays video games related to sports games and fighting games. To determine which viewports 303 to include in the switchboard interface 302a, an AI module may be configured to receive the spectator playbook and the event data as inputs and process the data accordingly.

After processing the spectator playbook and the event data, the AI module may identify features (e.g., 18-year-old, male, interest in sports games and fighting games, etc.) associated with the spectator user and classify the features accordingly. The classified features and the event data are then used by a machine learning engine to label and predict various viewports into the live event that may be of significance and/or importance to the spectator user. Accordingly, as shown in FIG. 3A, the predicted viewports, e.g., v1-v8, may include a range of viewports such as those that are popular among 18-year-old males, viewports that involve sports (e.g., baseball, basketball, etc.), viewports that relate to combat sports (e.g., kickboxing, wrestling, boxing, etc.), or combinations thereof. By using machine learning, the viewport selection is configured to improve over time based actions taken by the spectator user or other spectators.

After being presented with the viewports 303 to select from, the FIG. 3A illustrates that viewport v4 as being selected, thus, resulting in the generation of viewport interface 306a as shown in FIG. 3B.

In one embodiment, as shown in FIG. 3B, the viewport interface 306a is generated in response to the spectator user 102 selecting the desired viewport 303 (e.g., v4) to view. As illustrated, the viewport interface 306a includes a scene of a kickboxing match between two kickboxers. The viewport interface 306a further includes a chat section 308, a commentary section 310, an avatar 312 associated with the commentary section 310, and a current viewport 316 icon.

In one embodiment, the chat section 308 may allow the spectator user 108 and other viewers who are viewing the viewport interface 306 to converse amongst each other in real-time about the activity occurring within the viewport interface 306. In some embodiments, the viewers may converse about other topics such as gaming strategies and tips, other viewports to view, game recommendations, interests, dislikes, etc. In one embodiment, an AI module may be configured to receive as inputs the comments from the chat section 308. For example, while viewing a specific viewport, the spectator user and the viewers may express that that they dislike a specific viewport they are viewing e.g., "I am bored, I need more action." The AI module may take into consideration the comments and the context of the viewport and use the data to build upon an AI model of the spectator. Using this data, the AI module can build a more accurate model to determine the type of actions and scenes that the spectator user might have an interest in.

In accordance with another embodiment, the commentary section 310 may include a play-by-play commentary on what is occurring within the viewport interface 306 and/or other information related to what is being watched. The play-by-play commentary of the scene can be provided in the commentary section 310 through written text in real-time. In accordance with another embodiment, the play-by-play commentary can be provided through words spoken by the avatar 312 and/or virtual influencers. For example, an avatar 312 representing an E-sports commentator may appear within the commentary section 310. The E-sports commentator may provide a running play-by-play commentary of the actions occurring within the viewport or commentate on "fun facts" that might be of interest to the spectator user.

In one embodiment, an AI module can help provide the play-by-play commentary. The AI module may be configured to receive as inputs the spectator playbook and event data and process the data accordingly. For example, the spectator playbook may reveal that the spectator user's favorite E-sports player is "KuroKy." After the AI module processes the spectator playbook and the event data, the spectator user may be presented with a list of viewports and specific times that "KuroKy" is expected to be in. While viewing a scene that involves "KuroKy," the running play-by-play commentary may zone in and focus on game actions performed by "KuroKy." In addition, throughout the scene, the commentary may include "fun facts" related to "KuroKy" such as where he is from, his gaming team, his achievements, how much time he spends practicing, what he does during his spare time, etc.

In accordance with another embodiment, the current viewport 316 icon may be displayed within the viewport interface 306. The current viewport 316 icon can provide spectator users with a reference showing which specific viewport 303 that is currently being viewed. The current viewport 316 icon can be displayed anywhere within the viewport interface 306.

Figure 3C:
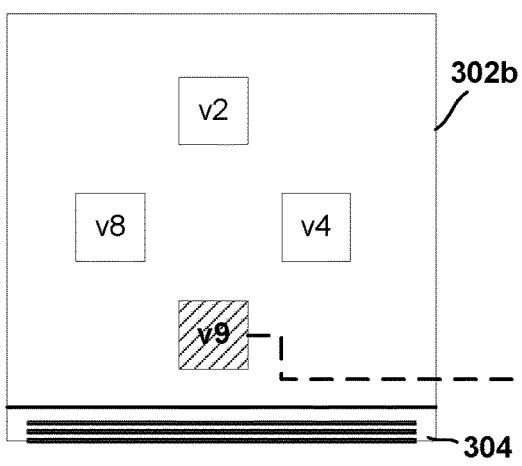
Figure 3D:
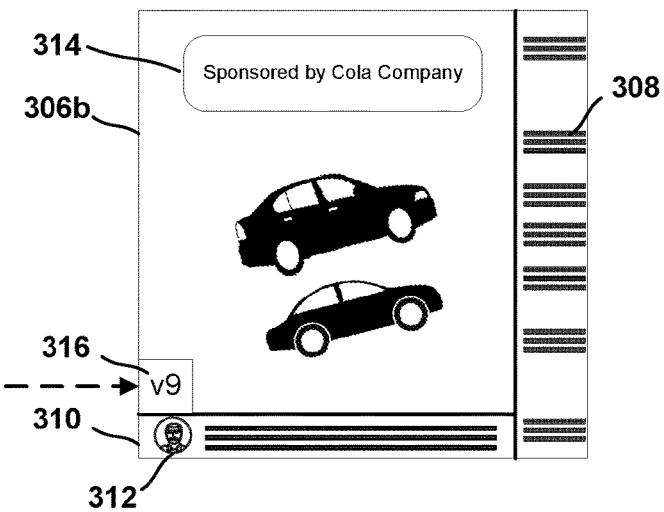

In another embodiment, FIGS. 3C and 3D illustrate the switchboard interface 302b and the generated viewport interface 306b. As shown in FIG. 3C, the switchboard interface 302 illustrates four viewports 303 (e.g., v2, v4, v8, v9) that are available for viewing and a switchboard comment section 304. During a live gaming event, as players progress along different paths, stages, or levels within the game world, an AI module may constantly process the spectator playbook and the event data. At any given time, based on the input data, the machine learning engine may predict certain actions and viewports that are interesting to the spectator and when it may occur. Accordingly, the AI module may generate an updated switchboard interface 302 and present it to the spectator user 102. As shown in FIG. 3C, the updated switchboard interface 302b includes an updated set of viewports 303 (e.g., v2, v4, v8, v9) that the spectator user 102 might be interested in.

The switchboard comment section 304 may include information related to the available viewports 303 such as a brief description of each viewport and any other information (e.g., scene, game level, players involved, points scored, etc.) that would help the spectator user 102 decide which viewport to select. As shown, viewport v9 is selected by the spectator user 102 to generate the desired viewport interface 306b for viewing.

In one embodiment, as shown in FIG. 3D, the viewport interface 306b illustrates a racing between two cars that are controlled by the players 104. Similar to the viewport interface 306a described above, the viewport interface 306b also includes a chat section 308, a commentary section 310, an avatar 312 associated with the commentary section 310, and a current viewport 316 icon. The viewport interface 306b further includes a sponsorship logo 314 that can be displayed anywhere within the viewport interface 306b. The sponsorship logo 314 may be associated with a company that is endorsing the players 104 in the game and/or the live event. In some embodiments, the sponsorship logo 314 may be an advertisement that is promoting a product that appeals to the spectator user 102. For example, as shown in FIG. 3D, the sponsorship logo 314 is displayed on an upper portion of the viewport interface 306b and associated with "Cola Company." In this example, "Cola Company" may be a sponsor of one or both players 104 driving the cars and/or the live event.

Figure 3E:
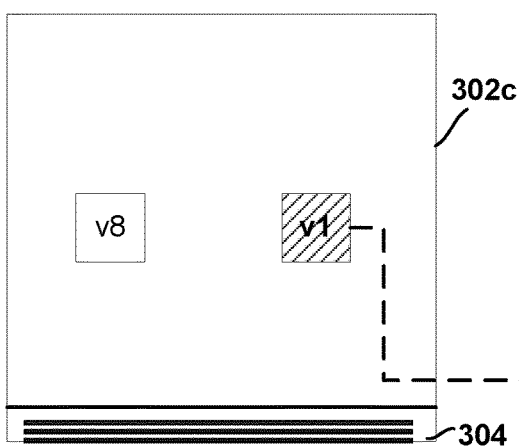
Figure 3F:
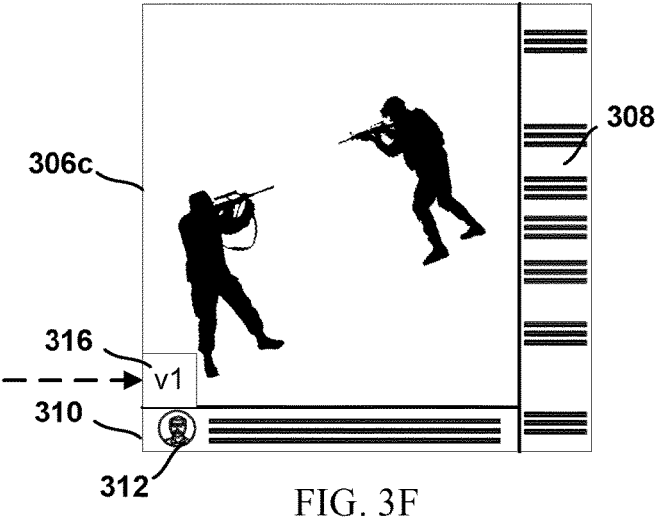

In another embodiment, FIGS. 3E and 3F illustrate the switchboard interface 302c and the generated viewport interface 306c. As noted above, an AI module may continuously process the spectator playbook and the event data to generate an updated switchboard interface 302c. This can be done at any given time so that the spectator user 102 can be presented with additional viewports 303 for viewing. Accordingly, as shown in FIG. 3E, the switchboard interface 302c includes two viewports 303 (e.g., v8, v1) that are available for viewing and a switchboard comment section 304. As discussed previously, the switchboard comment section 304 may include a brief description of viewports v8 and v1 and/or any information related to the viewports. As illustrated, viewport v1 is selected by the spectator user 102 for live viewing which generates viewport interface 306c.

In accordance with another embodiment, as shown in FIG. 3F, the viewport interface 306c illustrates a war battle occurring between a solider and an enemy solider that are controlled by the players 104. As discussed above, the viewport interface 306c may also include a chat section 308, a commentary section 310, and an avatar 312 providing commentary on the events occurring in the viewport interface 306c.

FIG. 4A is an embodiment illustrating a timeline with a series of viewports selected for inclusion into the switchboard interface (e.g., viewports 404), a series of viewports that are selected by the spectator user (e.g., viewports 406), and a series of viewports identified for recording (e.g., viewports 408). The figure illustrates timeline 402 with the series of viewports as a function of time, e.g., t0 through t7. Over a given time period, the system determines which viewports 303 to select for inclusion into the switchboard interface 302 for live viewing, e.g., viewports 404. Accordingly, a series of viewports 404 having different viewports 303 at different time periods are presented to the spectator user 102 for selection. For a given time period, the spectator user 102 may select a viewport for live viewing which results in a series of selected viewports 406.

In one embodiment, the system may continuously update the switchboard interface to include a new set of viewports and notify the spectator user 102 that new viewports are available for viewing. In some embodiments, the system may update the switchboard interface during a session when the spectator user is viewing a game. The updating of the switchboard interface is configured to occur based on contextual changes in the live game. For example, as shown in FIG. 4A, at time t2, viewport v1 (e.g., war battle scene) was selected by the spectator user for viewing. During the viewing session, at a later point in time, e.g., time t3, the switchboard interface may be updated to include viewports v5 and v6 which provides views into a kickboxing scene that just started. In this example, since the AI module is constantly processing the spectator playbook and the event data, at time t3, the AI model may provide the spectator user 102 with viewports v5 and v6 because it knows that the spectator enjoys kickboxing and because it knows that the kickboxing scene begins at time t3. Accordingly, in one embodiment, new scenes and/or specific actions occurring within the game world that may be of interest to the spectator user may cause the system to update the viewports on the switchboard interface. When updates are made to the switchboard interface, the spectator user may be notified that new and/or recommended viewports are available.

In accordance with another embodiment, to update the switchboard interface 302 and to determine the availability of new viewports to include in the switchboard interface, the system may continuously make calls to the machine learning model. For example, the call to the machine learning model may be performed by a switchboard that is located on a server. Since the AI module is constantly processing the spectator playbook, event data, and feedback inputs from the spectator user, at any given point in time, the machine learning model may have an updated set of viewports that may be may be of interest to the spectator user 102.

As further illustrated in FIG. 4A, the viewports 303 that are not selected for live viewing, the system can automatically record and save the viewports for non-live viewing, e.g., recorded viewports 408. The spectator user 102 may access and view the recorded viewports 408 at any desired time. For example, at time t1, viewports v8 and v1 are presented to the spectator user 102 for live viewing. The figure shows viewport v8 as being selected for viewing which results in viewport v8 being grouped into selected viewports 406. The unselected viewport, e.g., v1, is automatically recorded and saved for non-live viewing at a later time which results in viewport v1 being grouped into recorded viewports 408.

In accordance with another embodiment, while viewing a viewport, the spectator user 102 may be presented with additional viewports at a given time for live or recorded viewing. In such circumstances, the spectator user 102 may decide to exit an existing live or recorded viewport and enter a different viewport for live or recorded viewing. In one embodiment, if the spectator user 102 exits a viewport and decides to view a different viewport, the viewport that the spectator user 102 exits can be automatically recorded and saved for viewing at a later time. For example, as shown in FIG. 4A, the spectator user 102 is viewing viewport v6 at time t3. At time t4, the viewports v10 and v7 are presented to the spectator user 102 for live viewing. At time t4, the spectator user 102 exits viewport v6 and selects viewport v10 for live viewing. Consequently, viewports v6 (e.g., viewport the spectator user exits) and v7 (e.g., viewport presented to spectator user at time t4) are automatically recorded and saved for viewing at a later time.

FIG. 4B is an embodiment providing a visual representation of the length of each recorded viewport with its corresponding start and end time. The figure provides a conceptual illustration of the various viewports that have been identified for recording (e.g., recorded viewports 408 in FIG. 4A). As shown, each recorded viewport can vary in length. The length of each recorded viewport can depend on the activity level that is occurring within a particular viewport. In some embodiments, the system can distinguish between an active viewport and an inactive viewport. If the system determines that the level of activity in a given viewport is inactive and/or minimal, the recording may automatically end or be put on pause. For example, at time t4, viewports v6 and v7 are selected for recording. Viewport v6 may include a view into a kickboxing fight between two fighters. Viewport v7 may include a view into a sailboat race between two sailboat racers. As illustrated in FIG. 4B, both viewports begin recording at time t4, however, viewport v6 ends at t5 while viewport v7 ends at t6. In this example, the recording for viewport v6 may end at time t5 because the first kickboxer "knocked out" the second kickboxer, thus, ending the fight. Since the fight ends after the "knock out," the recording also ends because there is no additional activity. Similarly, the recording for viewport v7 may end at time t6 because one sailboat racer crossed the finish line, thus, winning the race. Accordingly, the length of each recorded viewport session will vary and depend on the corresponding activity level in the interactive content of the game.

In other embodiments, some recorded viewports may have more than one recorded session (e.g., session 410) associated with a particular viewport as illustrated in FIG. 4B. As shown in the figure, session 410 represents recorded viewport v8 which are separated into two sessions, recorded viewports v8-1 and v8-2. The recording for recorded viewport v8-1 begins at time t2 and is paused at time t4. The recording then resumes at time t5 and ends at time t7 which results in recorded viewport v8-2. This recorded viewport may include two sessions (e.g., v8-1 and v8-2) because there is a delay in the activity which causes the recording to pause and to resume at a later time. For example, viewport v8 may include a view into an American football game. The recorded viewport v8-1 may begin recording at t2 which is when the football game begins. At time t4, the recorded viewport v8-1 may be paused due to inactivity within the viewport such as an injury, timeout, weather delay, referee reviewing a play, halftime, etc. The recording for the viewport then resumes and ends at a later point in time when the activity begins, resulting in recorded viewport v8-2

Figure 5:
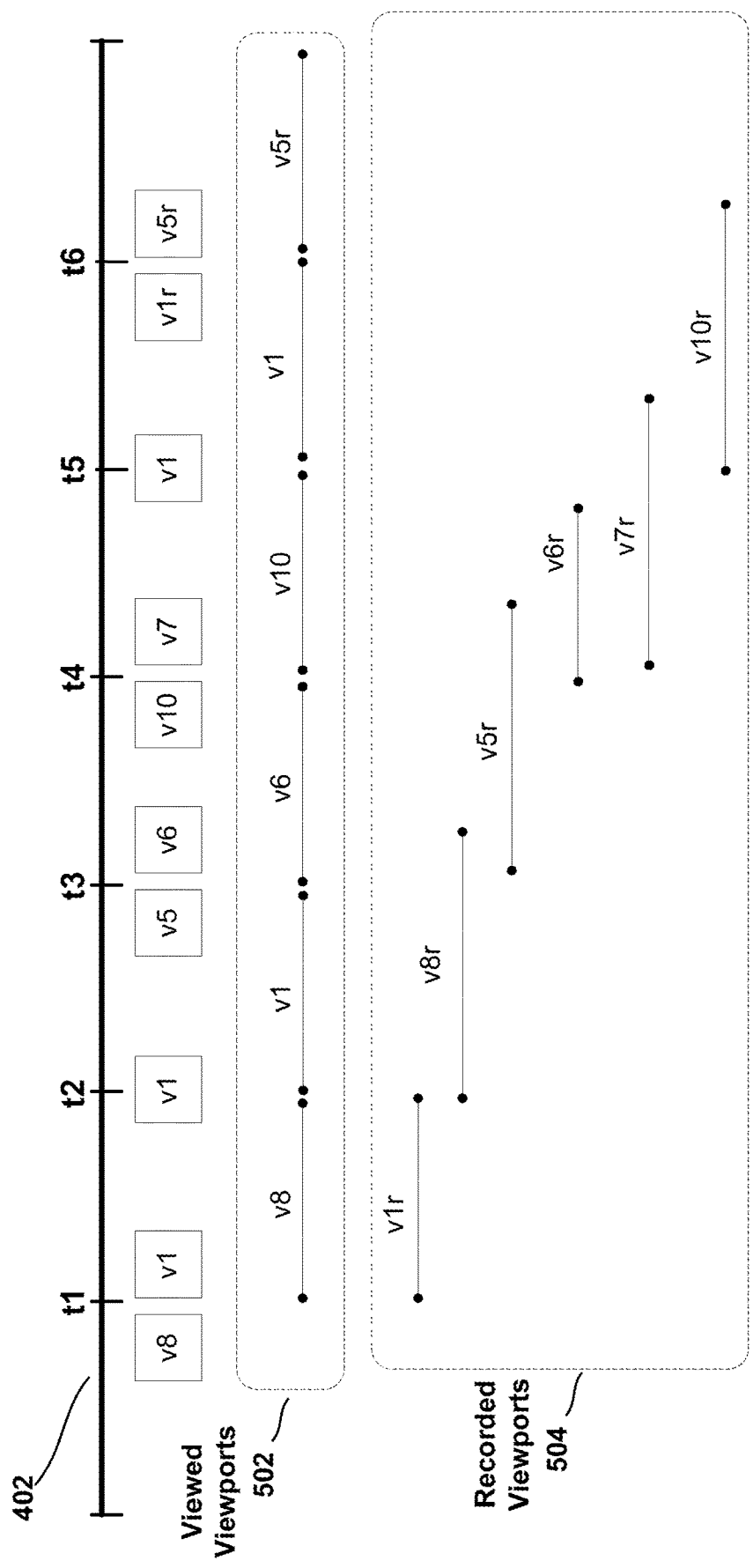
FIG. 5 illustrates an embodiment of a timeline with viewed viewports that are selected by the spectator user for viewing, and recorded viewports that are recorded and saved for viewing at a later time, in accordance with an implementation of the disclosure.

FIG. 5 is an embodiment illustrating a timeline with the viewed viewports 502 that are selected by the spectator user for viewing, and the recorded viewports 504 that are recorded and saved for viewing at a later time. Over a given time period, one or more viewports may be presented to the spectator user for live viewing and/or non-live viewing. As mentioned above, the viewports that are selected and recommended to the user, in one embodiment, is based on machine learning processing. For example, as shown at time t1, viewports v8 and v1 are presented to the spectator user for live viewing. At time t6, recorded viewports (e.g., v1r and v5r) may be presented to the spectator user 102 for viewing. FIG. 5 further illustrates the various viewports that are being viewed by the spectator user at a given time, e.g., viewed viewports 502. For example, at time t3 through t7, viewports v6, v10, v1, and v5r were selected and are viewed by the spectator user.

FIG. 5 further illustrates the recorded viewports 504 for a given time period. As discussed above, the viewports that are not selected by the spectator user 102 for viewing may be automatically recorded and saved for future viewing. This prevents the spectator user 102 from missing out on important scenes that occurred throughout the live event. For example, at time t3, the spectator user 102 may be presented with viewports v5 and v6 which are both equally appealing to the spectator user 102. The spectator user may select viewport v6 for live viewing while viewport v5 is automatically recorded, e.g., v5r. At time t6, the spectator user 102 may be presented with recorded viewports v1r and v5r for viewing. Accordingly, the spectator user can watch any of the recorded viewports 504 at their desired time. In one embodiment, the viewports that are selected 502 by the spectator user are also used as inputs to the machine learning engine. Those inputs, i.e., selections of viewports, can be used for re-enforced learning. This feedback in inputs to the model, in one embodiment, provide for more refined selections of viewport options to present to the user as selectable options. Furthermore, as each spectator user makes selections, the spectator user's learning model becomes more personalized.

In some embodiments, the viewports selected for recording, e.g., recorded viewports 504, can be optimized by removing video frames that may be irrelevant to the spectator user 102. For example, some recorded viewports may contain advertising content that may not be interesting to the spectator user 102 or may be obscuring more interesting recorded gameplay. These video frames or overlay frames may be removed so that the spectator 102 does not have to waste time viewing content that they are not interested in. In some embodiments, the removed video frames may shorten the recorded content, so that idle time or non-active events are removed to allow the spectator user 102 to more quickly view that content that is likely to be of interest.

Figure 6:
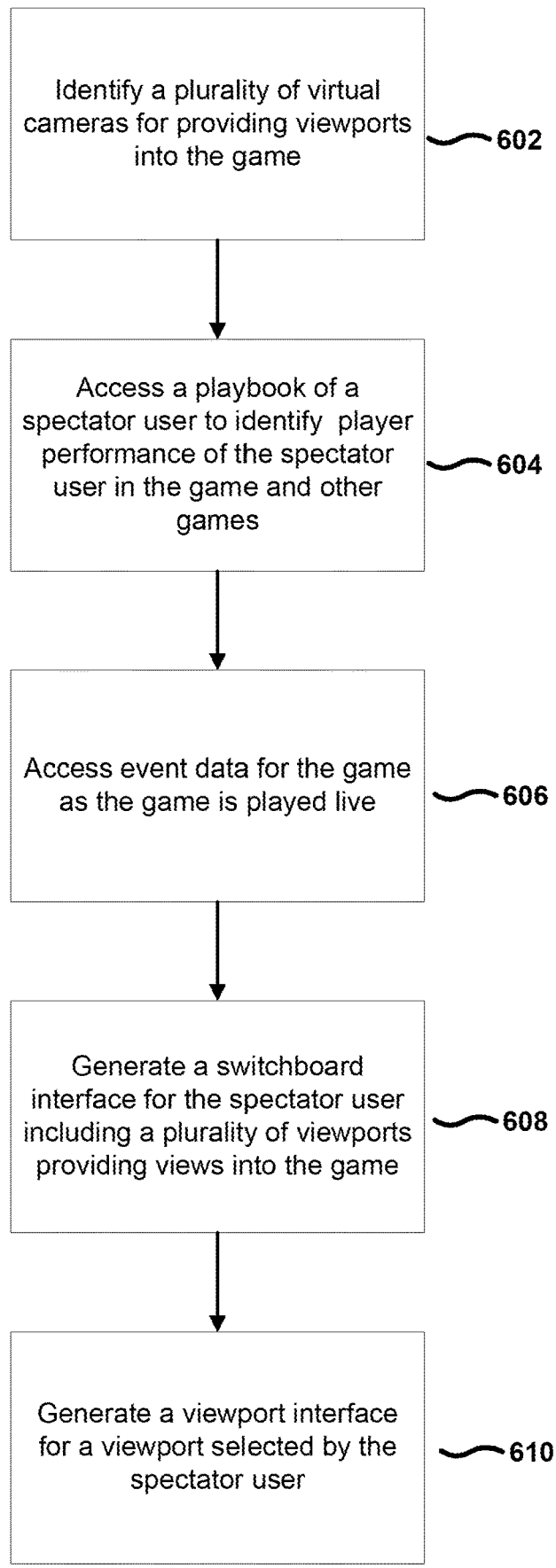
FIG. 6 illustrates an embodiment of a method for selecting viewports into a game so that the viewports are consistent with the interests of a spectator user, in accordance with an implementation of the disclosure.

FIG. 6 shows an overall flow of an embodiment of a method for selecting viewports into a game so that the viewports are consistent with the interests of a spectator user. According to the shown embodiment, the method includes an operation 602 that identifies a plurality of virtual cameras 204 for providing viewports 303 into a live game. As discussed earlier, the virtual cameras 204 may be dispersed throughout the game environment, e.g., game world. Each virtual camera 204 may have a corresponding camera POV 206 which can provide a corresponding viewport into the live game. Operation 604 is configured to access a playbook of a spectator user 102 to identify player performance of the spectator user 102 in the live game and other games played by the spectator user 102. In some embodiments, the playbook is associated with a profile of the spectator user 102 and includes information such as gender, age, gaming experience, game play history, viewing history, gaming skill level, preferences, interests, disinterests, sponsors, endorsements, etc. In some embodiments, the profile of the spectator user 102 may include a model that may be initially trained using global features of users similar to the spectator user 102. Over time, the model, based on the spectator user 102 input and actions, e.g., selections and views, will be trained more specifically to the spectator user's 102 likes, dislikes, tendencies and can be used to predict what the user may wish to view with more accuracy.

The method flows to operation 606 where the operation may be configured to access event data for the game as the game is being played live by the players 104. As noted above, the event data may be information associated with the game scenes occurring in the live event, game actions performed by the players, interactions between the players, progression in the game, points scored, total number of virtual cameras, various viewports, etc. At operation 608, the method may include generating a switchboard interface 302 for the spectator user 102 which may include a plurality of viewports 303 providing views into the game. In some embodiments, operation 608 may be configured to select the plurality of viewports 303 for inclusion into the switchboard interface 302 based on the event data and the playbook of the spectator user 102. As discussed above, the switchboard interface 302 may be customized for each spectator user 102 since the viewports 303 selected for inclusion into the switchboard interface 302 can be selected based on the attributes and interests of the spectator user 102.

Once the switchboard interface 302 is presented to the spectator user 102, the spectator user 201 may select a desired viewport to generate a viewport interface 306. Accordingly, operation 610 of the method may generate a viewport interface 306 for the viewport 303 selected by the spectator user 102. As discussed previously, in some embodiments, the viewport interface 306 may include a variety of features such as a chat section, a commentary section, an avatar associated with the commentary section, a current viewport icon, a sponsorship/endorsement icon, etc. In some embodiments, viewports 303 that are not selected for viewing are recorded and saved so that the spectator user 102 can access at a later time.

Figure 7:
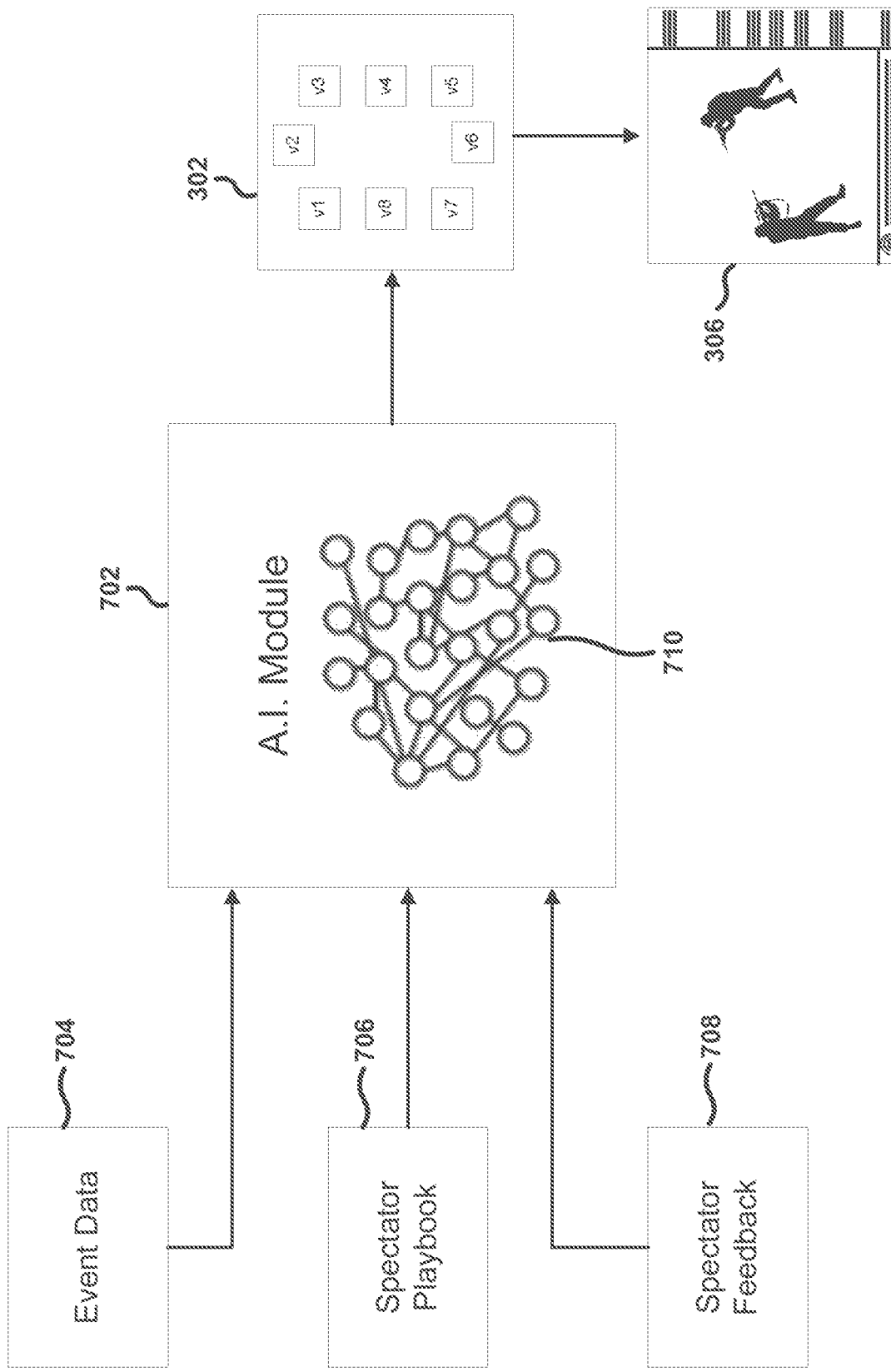
FIG. 7 illustrates an embodiment of a method for selecting viewports for inclusion into a switchboard interface using an Artificial Intelligence (AI) module, in accordance with an implementation of the disclosure.

FIG. 7 illustrates an embodiment of a method for selecting viewports 303 for inclusion into the switchboard interface 302 using an Artificial Intelligence (AI) module 702, and additionally, event data 704, spectator playbook 706, and spectator feedback 708. In one embodiment, the AI module 702 implements one or more machine learning operations that ingest spectator selections, spectator non-selections, spectator comments, comments and/or conversations between the spectator and other spectator, or between the spectator and players of the game. One example method includes accessing the event data 704 for the game as the game is played live by the players 104. As discussed above, the event data 704 may be include a variety of information associated with the event and game such as the scenes occurring in the event, game actions performed by the players, interactions between the players, progression in the game, points scored, the type of content being displayed, the types of views provided by the one or more virtual cameras, the total number of virtual cameras, various viewports, etc. In one embodiment, the machine learning model is configured to process metadata produced by the game, which can be parsed to identify specific features that relate to the actions and feedback of the spectator.

In another embodiment, the event data 704 may include event data from more one or more instances of a game that is occurring simultaneously and rendering different events. For example, during a FIFA World Cup tournament, there may be more than one soccer match occurring simultaneously where several teams are competing against one another. Because multiple soccer matches are occurring simultaneously, there may be some overlap among the soccer matches. Accordingly, the selected viewports 303 may include viewports obtained from one or more distinct sessions (e.g., soccer match) of the same game or other games (e.g., soccer). This will allow the spectator user to view specific content and not miss out on certain actions that are occurring in the FIFA World Cup tournament and other events that the spectator user might have an interest in (e.g., specific soccer matches and teams, certain players, when a goal is predicted to be scored, other sporting events, etc.).

In another embodiment, the method may further include accessing the spectator playbook 706. The spectator playbook 706 may be used to include attributes and characteristics about the spectator user 102. The spectator playbook 706 may also help determine which viewports 303 into the game the spectator user 102 might be interested in. In some embodiments, the spectator playbook 706 may include information such as the spectator user's gender, age, gaming experience, game play history, viewing history, gaming skill level, preferences, interests, disinterests, etc. In some embodiments, the spectator playbook 706 may include a history of interactive use of the live game and other games that have been played by the spectator user 102. The interactive use of the games may include metadata used for classifying the game performance of the spectator user 102 for types of interactive scenes or content of the live game and/or other games that are played by the spectator user 102. In some embodiments, the metadata can be classified by a machine learning model that is associated with a profile of the spectator user 102.

In another embodiment, social media data from the spectator user's social media accounts (e.g., Facebook, Twitter, Twitch, Instagram, etc.) can be accessed to enable augmentation of the spectator playbook 706. In one embodiment, the social media data can be obtained by the cloud gaming system using an API provided by the social media site. In some embodiments, the social media activity (e.g., likes, comments, followers, etc.) of the spectator user can assist in understanding the spectator user's preferences, interests, disinterests, etc. This information, in turn, can be data mined to add useful information to the spectator playbook 706. Accordingly, with a better understanding of what the spectator user is interested in, the selected viewports can be more consistent with the interests of the spectator user. For example, the spectator user's Facebook page may provide indicators that the spectator user recently watched or liked the movie "Tomb Raider" and/or is recommending the movie to friends and/or family. This information may be parsed and analyzed for incorporation into the spectator playbook 706. In one embodiment, viewports that are related (e.g., action-adventure games, third-person perspective games, female characters, etc.) to the movie "Tom Raider" can be selected for inclusion into the switchboard interface. In one configuration, the social media data can be processed using machine learning, and the processing can produce features that are labeled and classified for augmenting the spectator user's playbook.

In another embodiment, a playbook associated with any individual person (e.g., professional E-sports player, friend, brother, etc.) may also be used as an input to the AI module 702. In this embodiment, the viewports 303 selected for the spectator user 102 may be based on a blend of a playbook associated with another individual and the spectator user.

In one embodiment, the spectator user 102 may be fascinated by the E-sports player, "KuroKy." In this embodiment, the system may access the playbook of KuroKy to blend in aspects of KuroKy playbook into the spectator user's playbook 706. This blending process can include weighting of actions and tendencies of KuroKy's playbook with those actions and tendencies of the spectator user's. In one embodiment, the decision to blend parts of KuroKy playbook with the playbook of the spectator user's can be done automatically by the cloud gaming system. By way of example, if the spectator user tends to watch KuroKy perform certain actions, then the system can progressively start to blend in those types of actions from KuroKy's playbook with the playbook of the spectator user.

In another embodiment, method may further include accessing the spectator feedback 708. The spectator feedback 708 may further help capture additional characteristics of the spectator user 102 since the feedback is provided directly from the spectator user 102. Accordingly, the spectator feedback 708 may help improve the accuracy of the selected viewports 303 for inclusion into the switchboard interface 302. By way of example, the machine learning mode of the AI module 702 may use the feedback to identify specific features that can be used to predict the spectator's tendencies or desires to watch specific types of actions/scenes of a game. For example, the spectator user 102 may be viewing a live viewport that includes a scene involving a sailboat race. Within the viewport interface 306, the spectator user 102 may participate in a live chat with other viewers. The spectator user 102 may insert a comment into the chat section 308 stating that "sailboats are boring; I would rather be watching a car race." This type of feedback feeds back to a machine learning model 710 to reinforce the system's understanding of the user's likes and dislikes. In this example, the system may take into consideration the context of the user's statement and infer that the spectator user 102 dislikes sailboats and has an interest in car races. Accordingly, system may present the spectator user 102 with additional viewports that includes scenes related to car races and/or any scenes related to automobiles. In addition, the system may prevent and/or limit viewports that include sailboat races from appearing in the future. It should be understood that the inferences made using the machine learning model 710 need not be explicit, but can be derived by a fusion of features ingested by the AI module 702 over time, and/or based on multiple feature inputs collected during specific times and in light of specific contextual content being shown in specific scenes viewed by the spectator.

The method then flows to AI module 702 which is configured to receive as inputs the event data 704, the spectator playbook 706, and the spectator feedback 708. Again, as noted above, other inputs that are not direct inputs or lack of input/feedback, may also be taken as inputs to the AI module 702. The AI module 702 may use a machine learning model 710 that is used to predict viewports 303 that may be of significance and/or importance to the spectator user 102. The AI module 702 may also identify patterns and similarities based on the spectator inputs. Using the patterns and similarities, the AI module 702 may infer and predict viewports that may be of interest to the spectator user. In some embodiments, the predictive viewports may include a selection value (e.g., weighting factor) to help determine which viewports to remove or select for inclusion into the switchboard interface. The weighting may also be used to filter some viewports out or include certain higher weighted viewports.

In one embodiment, the AI module 702 may process the above noted inputs to identify features associated with the context of the live event, performance attributes (e.g., spectator user is highly skilled in car racing games) of a spectator in relation to the features in the live game, the characteristics of the spectator user, the game context, spectator feedback etc., in order to classify the features, using one or more classifiers. The classified features are then used by a machine learning engine to predict various viewports associated with the interests of the spectator user. These viewports may include particular game genres, particular scenes, complexity of the game, popularity of the game, novelty of the game, etc. that may be of importance to the spectator user.

In one embodiment, the classified features of the spectator user 102 can identify a likelihood of the spectator user 102 preferring a specific type of content over another. An AI module may assign a higher selection value (e.g., weighting factor) to those viewports that the spectator user 102 may have a higher likelihood of preferring. Accordingly, during the dynamic selection of the viewports, viewports with higher selection values may have a higher priority to be selected for inclusion into the switchboard interface 302. For example, based on a profile of a spectator user 102, the spectator user 102 may have an interest in several sports which may include kickboxing, soccer, and football. The profile may reveal that the spectator user 102 competes in kickboxing matches and regularly watches kickboxing game scenes. For soccer and football, the spectator profile may indicate that the spectator user watches these types of game scenes on occasion. Accordingly, a higher selection value would be assigned to kickboxing scenes while lower selection values would be assigned to soccer and football scenes. Thus, assigning selection values to particular features associated with the spectator user 102 can help with the dynamic selection of the viewports.

The output of the AI module 702 can be information for rendering one or more viewports 303 that can be included into the switchboard interface 302. Accordingly, the method flows to switchboard interface 302 which is configured to receive the one or more viewports 303 predicted by the AI module 702. As noted above, the switchboard interface 302 may be unique and custom for each spectator user 102 because the viewports 303 are determined based the attributes and characteristics of the spectator user 102 as noted above. The number of viewports 303 provided on the switchboard interface 302 may vary on the activity occurring in the live event. In some embodiments, the switchboard interface 302 may include a comments section 304 that provides description of each viewport and any other relevant information (e.g., scene, game level, players involved, points scored, etc.) that would help the spectator user 102 decide which viewport to select for viewing. Accordingly, the spectator user may select from the available viewports 303 that are provided in the switchboard interface 302. In some embodiments, the unselected viewports 303 may be automatically recorded and saved for viewing at a later time.

After the selection of the viewport, the method flows to the generation of viewport interface 306. In one embodiment, the viewport interface 306 provides the spectator user with a live view into the selected viewport. In certain embodiments, the viewport interface 306 can provide the spectator user with a previously recorded view into the game. In some embodiments, the viewport interface 306 may include a variety of features such as a chat section 308, a commentary section 310, an avatar 312 associated with the commentary section 310, and a current viewport 316 icon.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for generating viewports into a game, comprising:

identifying a plurality of virtual cameras for providing viewports into the game;

accessing a playbook of a spectator user, the playbook identifying performance of the spectator user in the game;

accessing event data for the game as the game is played live; and generating a switchboard interface for the spectator user including a plurality of viewports providing optional views into the game, the plurality of viewports being dynamically selected based on processing the event data and the playbook of the spectator user through a machine learning model, the machine learning model is configured to identify features from the event data and the playbook to identify attributes of the spectator user, the attributes of the spectator user being used to select the plurality of viewports into the game.

2. The method of claim 1, wherein the plurality of viewports being dynamically selected for inclusion into the switchboard interface is further based on processing one or more feedback inputs from the spectator user, the processing uses the machine learning model to determine which ones of the plurality of viewports to select or remove from selection into the switchboard interface.

3. The method of claim 1, further comprising,
updating the switchboard interface to include one or more changes to selection of the plurality of viewports while the spectator user is viewing one of the plurality of viewports, the updating is configured to occur based on contextual changes in the game identified from the event data;
wherein said updating makes calls to the machine learning model to obtain predictions as to types of viewports are of interest to the spectator user while the spectator user is viewing the game.

4. The method of claim 1, wherein said updating is a process that interfaces with the machine learning model to obtain predictions as to types of viewports that are of interest to the spectator user while the spectator user is viewing the game.

5. The method of claim 4, further comprising,
generating a notification to the spectator user that one or more new viewports are available to view that are predicted to be of interest to the spectator user.

6. The method of claim 1, wherein the playbook includes a history of interactive use of the game and other games played by the spectator user, the interactive use being processed to identify metadata used for classifying the performance of the spectator user for types of interactive scenes or content of the game or said other games, wherein said classifying of the metadata is used by the machine learning model that is associated to the profile of the spectator user.

7. The method of claim 1, wherein the classified attributes of the spectator user identify a likelihood of the spectator user to prefer viewing of specific types of content, wherein the dynamic selection of viewports includes increasing a selection value of viewports that include the specific types of content.

8. The method of claim 1, further comprising, generating a viewport interface for a viewport selected by the spectator user.

9. The method of claim 8, wherein one or more of the viewports that are not selected to view live are recorded for non-live viewing.

10. The method of claim 1, further comprising,
generating a viewport interface for a viewport selected by the spectator user, the viewport interface includes a chat section that is configured to receive at least part of the feedback from the spectator user, said chat section is configured to receive input from one or more other viewers viewing the viewport.

11. The method of claim 1, wherein the switchboard interface further includes a comments section, said comments section providing information related to the plurality of viewports.

12. The method of claim 1, wherein the plurality of virtual cameras are fixed or dynamically move with a corresponding scene within the event of the game.

13. The method of claim 1, wherein the event data includes a plurality of scenes that captures activities in the game.

14. The method of claim 1, wherein recording of a viewport is in response to exiting a live viewing of a viewport.

15. A method for presenting an interface having viewports into a game to a spectator user, the method being processed by one or more servers of a cloud system and the spectator user connects over a network to the cloud system for spectating the game, comprising:
identifying a plurality of virtual cameras for providing viewports into the game;
accessing a playbook of the spectator user, the playbook identifying attributes of the spectator user in relation to one or more game features of the game;
accessing event data for the game as the game is played and the spectator user is viewing the play of the game;
generating a switchboard interface for the spectator user including a plurality of viewports providing views into the game, the plurality of viewports being dynamically selected for switchboard interface based on processing the event data and the playbook of the spectator user through a machine learning model; and
updating the switchboard interface to include one or more changes to selection of the plurality of viewports while the spectator user is viewing one of the plurality of viewports into the game.

16. The method of claim 15, wherein the updating is configured to occur based on contextual changes in the game identified from the event data.

17. The method of claim 15, wherein the machine learning model is configured to identify features from the event data and the playbook to identify the attributes of the spectator user, the attributes of the spectator user being used to influence selection of the plurality of viewports into the game.

18. The method of claim 15, wherein the plurality of viewports being dynamically selected for inclusion into the switchboard interface is further based on processing one or more feedback inputs from the spectator user, the processing uses the machine learning model to predict which ones of the plurality of viewports to select or remove from selection into the switchboard interface.

19. The method of claim 15, wherein said plurality of viewports being dynamically selected for inclusion includes processing and updating continuously during one or more sessions when the spectator user is viewing the game, and said updating makes calls to the machine learning model to obtain predictions as to types of viewports that are of interest to the spectator user and available from the virtual cameras while the spectator user is viewing the game.

20. The method of claim 15, wherein the attributes of the spectator user are used to identify a likelihood of the spectator user to prefer viewing of specific types of content, wherein the dynamic selection of viewports includes increasing a selection value of viewports that include the specific types of content when said specific types of content become available from action occurring in the game.

* * * * *